Feb. 11, 1958 — J. H. HAMPTON — 2,822,915
CONTINUOUS FLOW CONVEYOR
Filed Sept. 30, 1954 — 6 Sheets-Sheet 3

INVENTOR.
JOHN H. HAMPTON
BY
ATTORNEY

United States Patent Office 2,822,915
Patented Feb. 11, 1958

2,822,915

CONTINUOUS FLOW CONVEYOR

John H. Hampton, Oaklyn, N. J., assignor to Beaumont Birch Company, Philadelphia, Pa., a corporation of Pennsylvania Application September 30, 1954, Serial No. 459,248

3 Claims. (Cl. 198—174)

The present invention relates generally to the art of material handling and is concerned more particularly with a conveyor for moving flowable solid material in a continuous stream.

Among the principal objects of the present invention is to provide an improved conveyor operating within a conduit to convey flowable solid material, such as coal or the like, from a point of material supply to a point of material discharge, the conveyor being of such articulated construction that it may be efficiently employed to move the material along curvilinear as well as rectilinear paths.

A further object of the present invention is to provide a conveyor of the character described wherein the articulated means carries flight attachments mounted thereon in an improved manner.

Another object of the present invention is to provide a conveyor of the character described wherein the articulated means is a link chain and the flight attachments carried thereby may be mounted on the links without any modification of the latter for the purpose and in such a way that they may be replaced without any necessity for dismantling the link chain.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings, which are illustrative of certain preferred embodiments of the present invention.

Referring to the drawings, and particularly to Figures 1 to 5, the present invention may be embodied in a horizontal continuous flow flight conveyor which comprises a dust-tight conduit or casing and a conveyor chain operatively mounted within the casing, the latter being designated generally by the numeral 10, and the conveyor chain being designated generally by the numeral 11.

Figure 1:
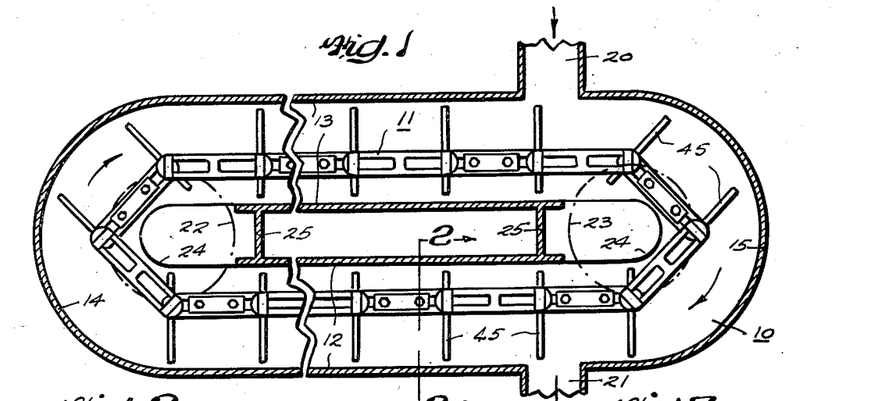
Figure 1 is a plan view of a conveyor embodying the present invention, the conveyor conduit or casing being shown with its top or cover removed.

The casing 10 is provided with a pair of elongated sections 12 and 13 which are disposed in parallel spaced relation, and with a pair of rounded sections 14 and 15 which are disposed respectively at opposite ends of the casing. The several sections of the casing 10 communicate freely with one another. The casing 10 includes horizontally extending top and bottom walls in the form of channel members which are designated respectively by the numerals 16 and 17 and vertically extending inner and outer sidewalls in the form of plate members which are designated respectively by the numerals 18 and 19. The outer sidewall 19 is provided with inlet and discharge means for the material to be conveyed, designated respectively by the numerals 20 and 21.

The casing 10 carries a pair of chain sprockets 22 and 23 which are mounted respectively at opposite ends of the casing for rotation about parallel vertical axes. The inner sidewall 18 is provided with a pair of openings 24—24 which accommodate the sprockets 22 and 23, and which are sealed respectively by a pair of cross walls 25—25.

Figures 2, 3, 4, 5:
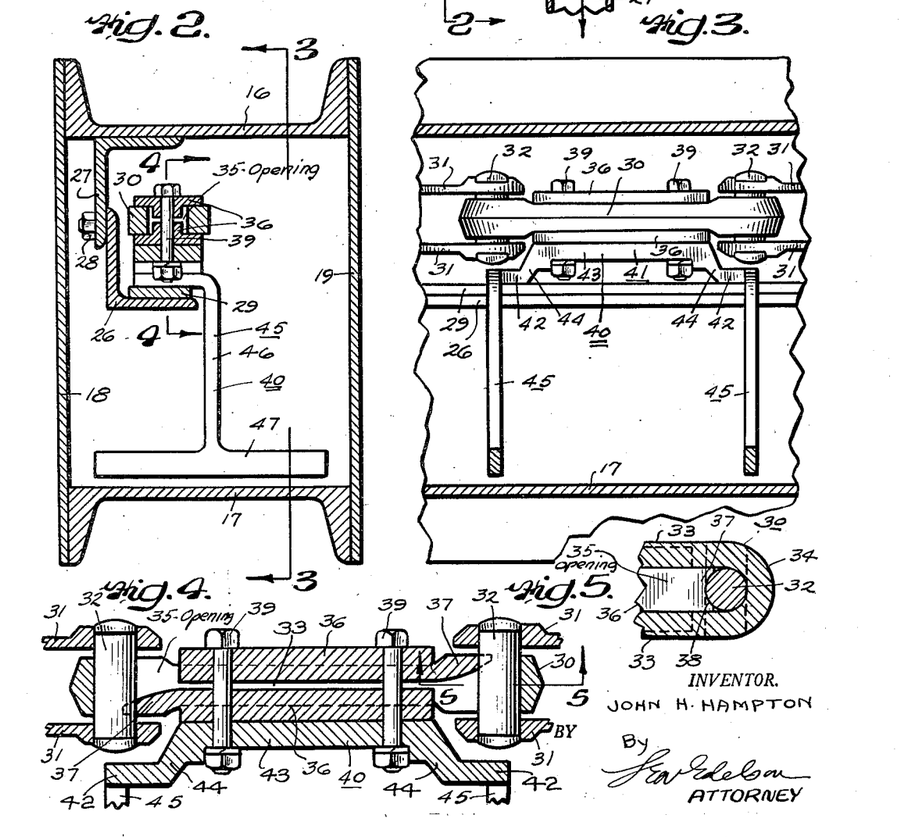
Figure 2 is an enlarged vertical section on line 2—2 of Figure 1, the conveyor conduit or casing being shown with its top or cover in place.
Figure 3 is a vertical section on line 3—3 of Figure 2.
Figure 4 is an enlarged vertical section on line 4—4 of Figure 2.
Figure 5 is a horizontal section on line 5—5 of Figure 4.

Referring particularly to Figures 2 and 3, the casing 10 is provided with chain guiding and supporting means in the form of a pair of angle-iron tracks or rails 26—26 which extend respectively only through the casing sections 12 and 13. A pair of corresponding legs of the rails 26—26 are disposed in a horizontal plane about midway between the top and bottom of the casing. The other pair of corresponding legs of the rails 26—26 are disposed vertically in spaced close relation to the inner sidewall 18. The rails 26—26 are suspended from the top wall 16 through the medium of suitably spaced angle-iron clips 27, to which clips the rails 26—26 are secured as by countersunk head bolts 28.

The conveyor chain 11 is housed within the casing 10, being carried by the sprockets 22 and 23 and the rails 26—26. Flat bar members 29—29 are interposed between the conveyor chain 11 and the underlying legs of the rails 26—26 to take the wear.

The chain, per se, is of the rivetless link type having center links 30 and pairs of side links 31—31 which are arranged alternately and connected together by pins 32 projected respectively through corresponding ends of the links. The chain is conventional and, therefore, a detailed description of the same is deemed to be unnecessary for a full understanding of the present invention. However, it will be noted that the center links 30 are in the form of flat bar members having longitudinally extending opposite side edges which are relatively narrow as compared to the width of the link, the broad top and bottom surfaces of each center link being substantially parallel to one another and to the plane of the wear plate 29. The bar member is longitudinally slotted to provide a pair of laterally spaced side portions 33—33 and a pair of rounded end portions 34—34, which all together define the central longitudinally extending slot or opening 35.

The center links 30 are provided with attachments each of which includes a pair of elongated adapters 36—36, one of which adapters is disposed on top of the side of the link 30 and the other on the bottom side thereof. The adapters 36—36 are T-shaped in transverse cross section, and, when disposed as aforementioned, the longitudinally extending head portions of the adapters 36—36 are seated against the link portions 33—33 with the longitudinally extending stem portions or ribs of the adapters 36—36 presenting toward one another and extending into the central link opening 35 between the link portions 33—33. Referring particularly to Figures 4 and 5, the adapters 36—36 are each provided with a portion 37 which is disposed in longitudinal continuation of the main body of the adapter 36, and which extends to the proximate pin 32, the terminal edge thereof being notched so as to extend part way around the body of the pin 32, as at 38. For rigidly securing the adapters 36—36 to the center link 30, a pair of bolts 39—39 are projected through the adapters 36—36, the central link opening 35 and a double flight unit which is yet to be described. When the several parts of the attachment are thus secured together, the adapters 36—36 conjointly form spacer means for the pins 32—32. Of course, the arrangement is such as to insure free relative pivotal movement of the several chain links.

The aforementioned double flight unit is designated generally by the numeral 40. It includes an attaching bar 41 the opposite end portions 42—42 of which are seated upon the wearing bar 29 and the intermediate portion 43 of which is raised above the wearing bar 29 by a pair of inclined portions 44—44, being disposed thereby in underlying relation to the center link 30 and the adapters 36—36 and being effectively secured against displacement as aforementioned. A pair of flight appendages 45—45 are formed integral respectively with the opposite end attaching bar portions 42—42 and depend from one side of the attaching bar 41 in overhanging relation to the wearing bar 29 and the underlying leg of the rail 26. Referring particularly to Figure 2, the flight appendages 45—45 are of inverted T-shape, the vertically extending stem portions 46—46 being disposed centrally between the casing sidewalls and the horizontally extending head portions 47—47 being disposed in spaced relation to the casing sidewalls and bottom wall. Referring particularly to Figure 3, the flight appendages 45—45 are disposed respectively in parallel vertical planes which extend transversely relative to the attaching bar 41 and which are spaced apart a distance equal to the pitch of the chain, each flight appendage 45 being disposed directly below a pin 32.

In the operation of the conveyor, the material to be conveyed is admitted to the casing 10 through the inlet 20 and deposited upon the bottom wall 17. The conveyor chain 11 moves in the direction indicated by arrows, as a consequence of which the flight appendages 45 shear through the material, causing it to flow through the rounded casing section 15 to the material outlet 21, where it is discharged from the casing 10. Any material delivered beyond the outlet 21 recirculates through the casing 10 and eventually is discharged.

As pointed out hereinbefore, in its passage through the casing sections 12 and 13, the conveyor chain 11 is carried by the casing top wall 16 through the medium of clips 27 and rails 26. The opposite end portions 42—42 of the attaching bars 41 move over the wearing bar 29 in contact therewith, as a consequence of which the attachments and more particularly the flight units 40 are subjected to wear while the chain itself is protected from wear. Replacement of a worn flight unit 40 may be effected by first removing a section of the casing outer wall 19 so as to expose the worn flight unit. The chain per se is high above the material in the casing and, therefore, easily accessible. As indicated hereinbefore, the worn flight unit 40 is secured to the associated adapters 36—36 and the latter are interlocked with their center link 30 (without any modification of the chain per se) by clamping action effected through the medium of bolts 39—39. Thus by simply backing the nuts off the bolts 39—39, any one of the flight units may be readily replaced with a new flight unit, all without in any way taking the chain itself apart. Only the worn flight unit need be replaced; the adapters 36—36 never need to be replaced.

The horizontal continuous flow flight conveyor described hereinabove and shown in Figure 2 is provided with one double flight unit 40 for each center link 30, it being noted that the attaching bars 41 of the flight units 40 are formed separately from their adjoining adapters 36 and that the flight units 40 are operatively suspended from the casing top wall 16 through the medium of the conveyor chain and its supporting rails 26.

Figure 6:
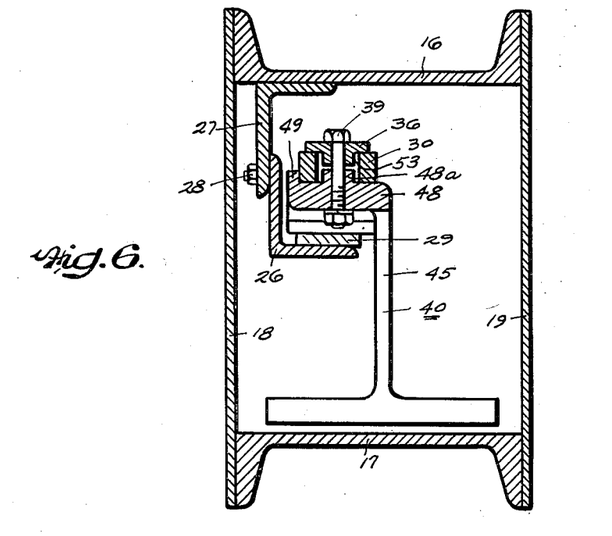
Figure 6 is the same as Figure 2 but shows a modified form of the flight attachment.

In the modified form of the continuous flow flight conveyor shown in Figure 6, the top interconnecting crossbar 48 of the double flight unit 40 is thickened somewhat and is provided in its top surface with a longitudinally extending rib 48a which projects upwardly into the bottom of the slot 53 of each center link 30. The crossbar 48, which thus replaces the ribbed adapter 36 and the attaching bar 41 of the flight-mounting arrangement shown in Figures 1 to 4, is preferably provided along its inner edge with an upstanding flange 49 which engages the proximate side edge of the center link to further secure the flight unit against possible displacement laterally of the conveyor chain, and to protect the side edge of the chain against wearing contact with the rail 26. As in the previously described arrangement, each slotted center link of the chain is fitted on its top side with an adapter 36, the attaching cross-bar 48 of the flight unit 40 and said adapter 36 being secured together in embracing relation to the center link by the bolts 39—39.

Figure 7:
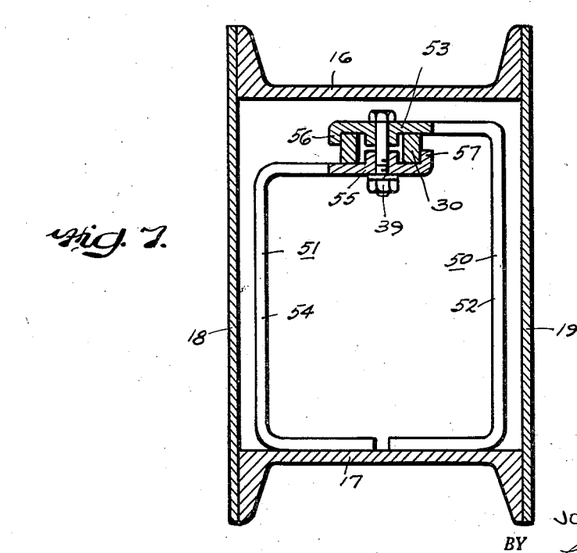
Figure 7 is the same as Figure 2 but shows a modified form of the conveyor conduit or casing and still another form of the flight attachment.

The modified form of the continuous flow flight conveyor shown in Figure 7 differs from those previously described in that each center link 30 of the conveyor chain supports a pair of modified flight units 50—51 of such complemental shape as to form a transversely disposed open flight of generally rectangular shape. Thus, the unit 50 for each chain center link 30 includes a pair of C-shaped flight elements 52 the upper portions of which are integrally interconnected by a longitudinally ribbed bar 53 which interfits with the top side of the slotted center link, while the units 51 each include a pair of oppositely presenting C-shaped flight elements 54 the upper portions of which are integrally interconnected by a longitudinally ribbed bar 55 which interfits with the bottom side of the slotted link, the flight attaching bars 53 and 55 being secured to opposite sides of their supporting link by bolts 39 as in the previously described arrangements. Preferably, the outer side edges of the bars 53 and 55 project beyond the corresponding side edges of the center link 30 and are respectively provided with flanges 56—57 which interlock with the link to prevent lateral displacement of the flight elements relatively to their supporting link. It will be noted that the flights of the arrangement shown in Figure 7 rest on the bottom wall 17 of the conveyor casing and are moved therealong by the conveyor chain, and thus in such arrangement the chain need not be provided with a supporting rail or guide, as in the case of the suspended flights shown in Figures 1 to 6 inclusive.

Figures 8, 9:
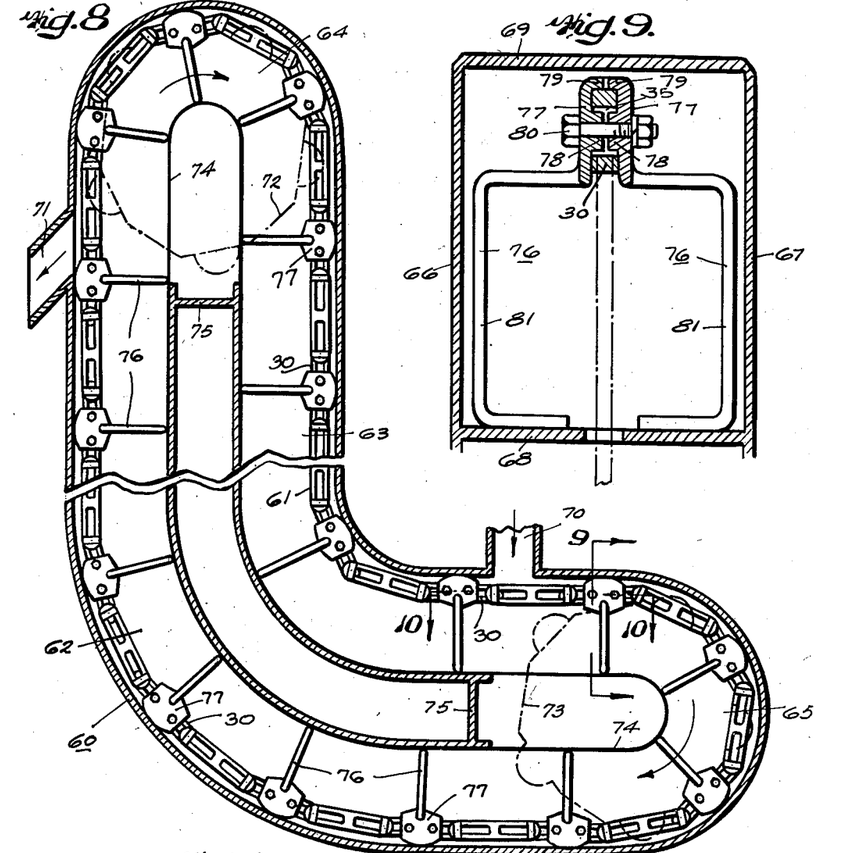
Figure 8 is an elevation of another conveyor embodying the present invention, the conveyor conduit or casing being shown with one sidewall removed.
Figure 9 is a vertical section on line 9—9 of Figure 8, the conveyor conduit or casing being shown with all four sides in place.
Figure 10:
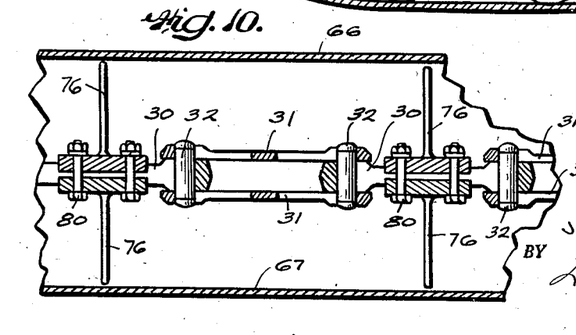
Figure 10 is an enlarged plane section on line 10—10 of Figure 8.

Again referring to the drawings, and particularly to Figures 8 to 10, the present invention may also be embodied in a vertical continuous flow flight conveyor which comprises a dust-tight conduit or casing and a conveyor chain operatively mounted within the casing, the latter being designated generally by the number 60, and the conveyor chain being designated generally by the numeral 61.

The casing 60 is provided with a pair of generally L-shaped sections 62 and 63 disposed along a common plane and in parallel spaced relation, and with a pair of rounded sections 64 and 65 which are disposed respectively at opposite ends of the casing. The several sections of the casing communicate freely with one another. The casing includes opposite side walls in the form of plate members designated respectively by the numerals 66 and 67 and inner and outer sidewalls in the form of plate members designated respectively by the numerals 68 and 69. The outer sidewall 69 is provided with inlet and discharge means for the material to be conveyed, designated respectively by the numerals 70 and 71.

The casing 60 carries a pair of chain sprockets 72 and 73 which are mounted respectively at opposite ends of the casing for rotation about parallel horizontal axes. The casing inner sidewall 68 is provided with a pair of openings 74—74 which accommodate the sprockets 72 and 73, and which are sealed respectively by a pair of cross walls 75—75.

The conveyor chain 61 is housed within the casing 60, being trained over the sprockets 72 and 73. The chain, per se, is of the conventional rivetless link type described hereinbefore, and therefore the several parts thereof are identified by the same numerals.

The center links 30 are provided with attachments each of which includes a pair of flight units 76—76 disposed respectively on opposite sides of the center link 30. The flight units 76—76 are provided respectively with elongated attaching bars 77—77 which are suitably formed to respectively provide them with longitudinally extending center ribs 78 and side flanges 79 through the medium of which the attaching bars 77—77 are disposed in interlocked relation with the slotted center link 30, as shown. For rigidly securing the attaching bars 77—77 to the center link 30, a pair of bolts 80—80 are projected through the flight attaching bars 77—77 and the central link opening 35. A pair of flight appendages 81—81 are formed integral respectively with the flight attaching bars 77—77. The flight appendages 81—81 are C-shaped and positioned in opposed coplanar relation so as to conjointly form an open generally rectangular flight structure disposed in the median transversely extending plane of the center link 30. The flight appendages 81—81 are disposed respectively in spaced relation to the casing opposite sidewalls 66 and 67, and referring particularly to Figure 9, the flight appendages 81—81 are disposed for moving over the casing inner sidewall 68 in contact therewith, the over-all depth of the flight units 76—76 being such that the attaching bars 77—77 are disposed in spaced relation to the casing outer sidewall 69.

In the operation of the conveyor, the material to be conveyed is admitted to the casing 60 through the inlet 70 and deposited upon the inner sidewall 68. The conveyor chain 61 moves in the direction indicated by arrows, as a consequence of which the flight appendages 81 shear through the material, causing it to flow through the rounded casing section 65 and the L-shaped casing section 62 to the material outlet 71, where it is discharged from the casing 60. Any material delivered beyond the outlet 71 recirculates through the casing 60 and eventually is discharged.

As indicated hereinbefore, the conveyor chain 61 normally courses through the L-shaped casing sections 62 and 63 with the flight units 76 in contact with the casing inner sidewall 68. However, operating conditions may cause the conveyor chain 61 to course through the L-shaped casing sections 62 and 63 with the flight units 76 associated with a section thereof in contact with the casing outer sidewall 69 instead of the inner sidewall 68. In any event, the flight units 76 are subjected to wear while the chain itself is protected from wear. Replacement of a worn flight unit 76 may be effected by first exposing the same through an access door (not shown) suitably formed in the casing outer sidewall 69. It should be apparent that the chain conveyor 61 is easily accessible. As indicated hereinbefore, each pair of flight units 76—76 are removably secured together and interlocked with their center link 30 (without any modification of the chain, per se) by clamping action effected through the medium of bolts 80—80. Thus, any worn flight unit may be replaced with a new flight unit without necessitating any dismantling of the chain itself.

Figure 11:
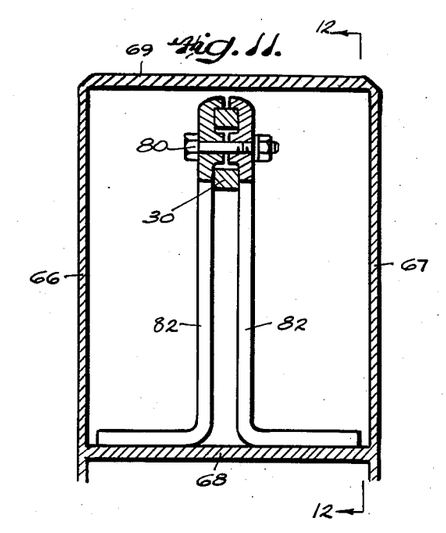
Figure 11 is the same as Figure 9 but shows a modified form of flight attachment.
Figure 12:
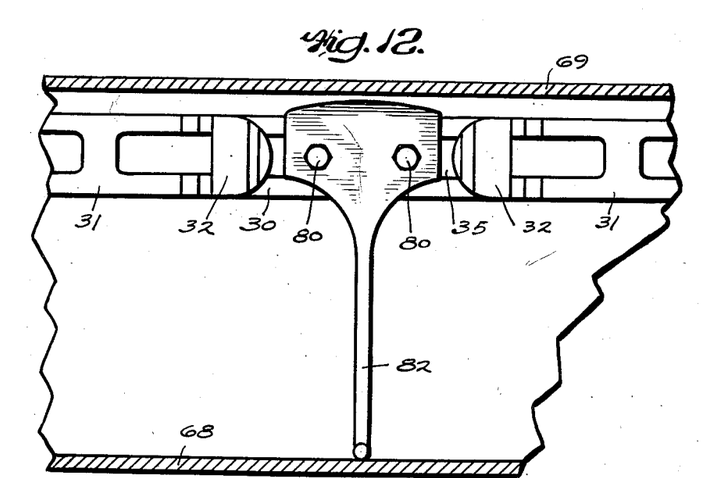
Figure 12 is a vertical section on line 12—12 of Figure 11.

The vertical continuous flow flight conveyor just described is provided with C-shaped flight appendages each pair of which conjointly form an open generally rectangular flight structure. The modified form of the vertical continuous flow flight conveyor shown in Figures 11 and 12 differs in that the C-shaped flight appendages of Figures 7 to 10 are replaced by L-shaped flight appendages 82 each pair of which conjointly form an open flight structure which is of inverted T-shape, as viewed in Figure 11.

It will be apparent, of course, that in all of the previously described modifications of the present invention, the flight units may be secured by their integral attaching bars to selected center links of the conveyor chain so as to provide for any desired spacing of the flights lengthwise of the chain. Also, each of the flight attaching bars may be provided with a pair of flight elements or appendages respectively joined to opposite end portions of the bar, as in the arrangement shown in Figures 1 to 4, or they each may be provided with a single flight element or appendage integral with the bar at a point located centrally between its opposite ends, as shown, for example, in Figures 8 to 12 inclusive.

Again referring to the drawings, and particularly to Figures 13 to 16, the present invention may also be embodied in another form of horizontal continuous flow flight conveyor which comprises a dust-tight conduit or casing and a conveyor chain operatively mounted within the casing, the latter being designated generally by the numeral 85, and the conveyor chain being designated generally by the numeral 86.

Figure 13:
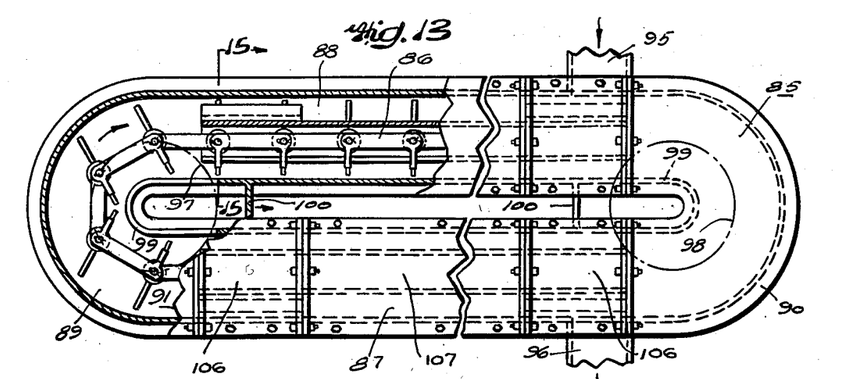
Figure 13 is a plane view of still another conveyor embodying the present invention, the conveyor conduit or casing being shown with its top or cover partially broken away.
Figure 14:
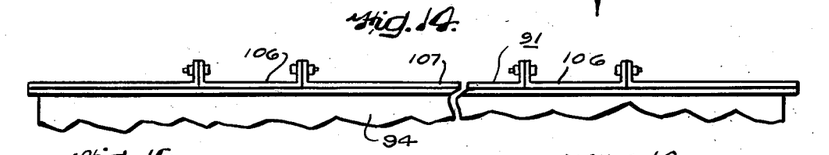
Figure 14 is a fragmentary elevation of the conveyor shown in Figure 13.

The casing 85 is provided with a pair of elongated sections 87 and 88 which are disposed in parallel spaced relation, and with a pair of rounded sections 89 and 90 which are disposed respectively at opposite ends of the casing. The several sections of the casing communicate freely with one another. The casing includes top and bottom walls in the form of plate members designated respectively by the numerals 91 and 92 and inner and outer sidewalls in the form of plate members designated respectively by the numerals 93 and 94. The outer sidewall 94 is provided with inlet and discharge means for the material to be conveyed, designated respectively by the numerals 95 and 96.

The casing 85 carries a pair of chain sprockets 97 and 98 which are mounted respectively at opposite ends of the casing for rotation about parallel vertical axes. The casing inner sidewall 93 is provided with pair of openings 99—99 which accommodate the sprockets 97 and 98, and which are sealed respectively by a pair of cross walls 100—100.

Figures 15, 16:
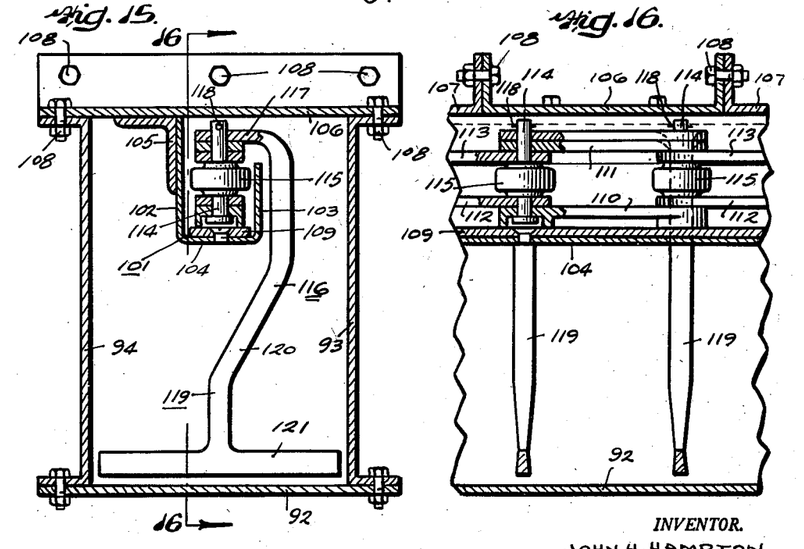
Figure 15 is an enlarged vertical section on line 15—15 of Figure 13, the conveyor conduit or casing being shown with its top or cover in place.
Figure 16 is a vertical section on line 16—16 of Figure 15.

Referring particularly to Figures 15 and 16, the casing 85 is provided with chain guiding and supporting means in the form of a pair of tracks or rails 101—101 which extend respectively through the casing sections 87 and 88 only. The rails 101—101 are sheet metal sections each of which has a pair of opposite side portions 102 and 103 turned upwardly from an intermediate base portion 104 to form therewith an open ended chain trough disposed in close underlying relation to the casing top wall 91 and centrally between the casing inner and outer sidewalls 93 and 94. The chain trough sidewall 102 is of sufficient height to close the space between the chain trough base 104 and the casing top wall 91, while the chain trough sidewall 103 is only of sufficient height to partially close the space between the chain trough base wall 104 and the casing top wall 91. The rails 101—101 are suspended from the casing top wall 91 through the medium of suitably spaced angle-iron brackets 105, to which brackets the rails 101—101 are secured in any suitable manner. The brackets 105 are themselves secured to the undersides of a plurality of upwardly presenting channel members 106 which extend transversely across the upper edges of the side walls 93—94 of the casing at suitably spaced intervals along the length of the casing, the spaces between said channels 106 being closed by removable top plate members 107. The channels 106 and the plate members 107 are detachably secured to one another and to the casing inner and outer sidewalls 93 and 94, as by bolts 108. The rails 101—101 which are secured to and supported by the brackets 105 extend lengthwise of the conveyor and so underlie the removable top wall plates 107 of the conveyor casing 85.

The conveyor chain 86 is housed within the casing 85, being supported by the sprockets 97 and 98 and the rails 101—101. Flat bar members 109—109 are interposed between the conveyor chain 86 and the underlying chain trough base walls 104—104 to take the wear.

The chain, per se, is of the roller link type having pairs of outer side links 110—111 which are arranged alternately with pairs of inner side links 112—113, and which are connected together by pins 114 projected respectively through corresponding ends of the links, and mounting rollers 115. The chain is conventional and, therefore, a detailed description of the same is deemed to be unnecessary for a full understanding of the present invention.

The pairs of outer links 110—111 are each provided with a flight unit which is designated generally by the numeral 116. The latter includes an attaching bar 117 which is generally of the same size and shape as the outer link 111, and which is disposed in overlying relation thereto. The pins 114—114 which mount the outer link 111 additionally project respectively through the opposite end portions of the attaching bar 117, the outer link 111 and the flight connecting bar 117 being conventionally secured against displacement, as by cotter pins 118—118. A pair of flight appendages 119—119 are formed integral respectively with the opposite end portions of the attaching bar 117 and depend from one side of the attaching bar 117 in overhanging outer spaced relation to the chain trough sidewall 103. Referring particularly to Figure 15, the flight appendages 119—119 are generally of inverted T-shape, the vertically extending stem portions 120—120 being suitably offset so as to position the lower ends thereof centrally between the casing sidewalls and the horizontally extending head portions 121—121 being disposed in spaced relation to the casing sidewalls and bottom wall. Referring particularly to Figure 16, the flight appendages 119—119 are disposed respectively in parallel vertical planes which extend transversely relative to the attaching bar 117 and which are spaced apart a distance equal to the pitch of the chain, each flight forming appendage 119 being disposed directly below a pin 114.

In the operation of the conveyor just described, the material to be conveyed is admitted to the casing 85 through the inlet 95 and deposited upon the casing bottom wall 92. The conveyor chain moves in the direction indicated by arrows, as a consequence of which the flight appendages 119 shear through the material, causing it to flow through the rounded casing section 90 to the material outlet 96, where it is discharged from the casing 85. Any material delivered beyond the material outlet 96 recirculates through the casing 85 and eventually is discharged. Replacement of a worn flight unit 116 may be effected by removing a plate member 107 so as to expose the top of the worn flight unit and additionally removing a suitable portion of the outer sidewall 94 so as to expose the side of the worn flight unit. As indicated hereinbefore, the worn flight unit 116 is mounted and secured against displacement (without any modification of the chain per se) by a pair of cotter pins 118—118. The chain itself is high above the material in the casing, and therefore the cotter pins 118—118 are easily accessible. After removing the latter, the worn flight unit 116 may be lifted off the pins 114—114 and then turned 90° as viewed in Figure 15 and passed through the opening in the casing outer sidewall 94. In order to mount a new flight unit 116, the procedure just described is reversed. The worn flight unit can be replaced with a new flight unit without dismantling the chain to any material degree.

Figure 17:
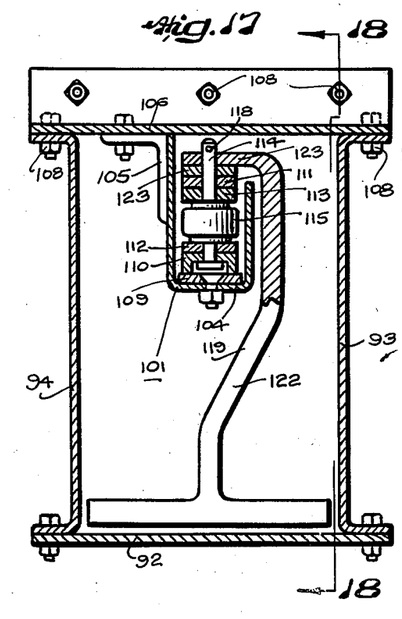
Figure 17 is the same as Figure 15 but shows a modified form of the flight attachment.
Figure 18:
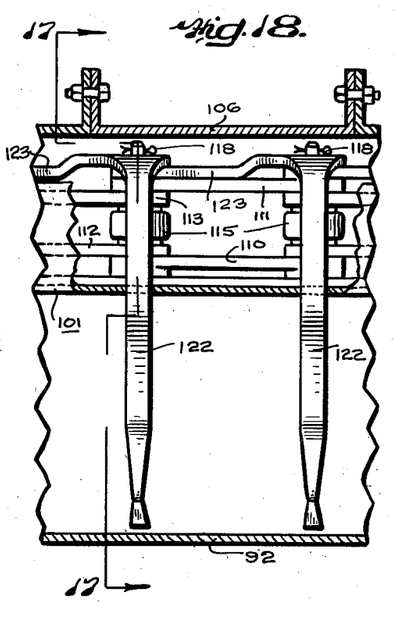
Figure 18 is a vertical section on line 18—18 of Figure 17.
Figure 19:
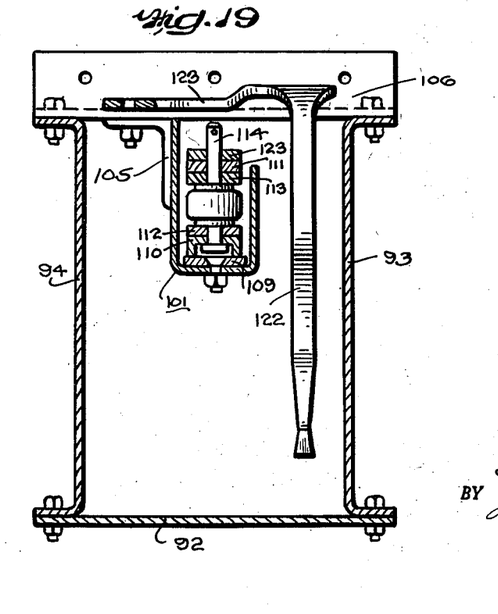
Figure 19 is the same as Figure 17 but shows a flight unit detached from the conveyor chain and positioned for removal from the conduit.

The horizontal continuous flow flight conveyor just described is provided with a flight unit 116 for each pair of outer links 110—111. No flight units are provided for the pairs of inner links 112—113. The modified form of the continuous flow flight conveyor shown in Figures 17 and 18 differs in that the flight units 116 are replaced by modified flight units designated by the numeral 122, and in that additional flight units 122 are provided respectively for the pairs of inner links 112—113. The flight units 122 each include an attaching bar 123 which is generally of the same size as the underlying outer link 111 or 113. The pins 114 project respectively through the opposite end portions of the attaching bar 123, the attaching bar 123 being secured against displacement by the cotter pins 118—118. A flight appendage 119 is formed integral with one end portion of the attaching bar 123, the aforementioned end portion being upwardly offset and disposed in overlapping relation to the proximate end portion of the adjoining attaching bar 123, as shown. In order to replace a worn flight unit 122 a plate member 107 is removed from the top wall of the casing so as to expose the top of the worn flight unit. The pair of cotter pins 118—118 which secure the worn flight unit against displacement may now be removed, whereupon the worn flight unit may be raised to disengage the same from the pins 114—114, turned 90° so that the head portion 121 of the flight appendage 119 is positioned along the casing inner sidewall 93 and then drawn out through the opening in the casing top wall 91 as indicated in Figure 19. In order to mount a new flight unit 122, the procedure just described is reversed.

It will be understood, of course, that the present invention is susceptible of various changes and modifications which may be made from time to time without departing from the general principles or real spirit of the present invention. For example, any of the conveyor casings illustrated could be in the form of an open rectangle having curved corners instead of in the form shown. In addition, the chain could be a rivet link type chain instead of either of the forms shown. Accordingly, it is intended to claim the same broadly, as well as specifically, as indicated by the appended claims.

What is claimed as new and useful is:

1. In a continuous flow conveyor for conveying flowable solid material, an endless conduit through which said material may be moved along a substantially horizontal plane, and chain means traversable through said conduit to move said material, said conduit being provided internally with means suspended from the top of said conduit and having an upwardly presenting surface for slidably supporting said chain means, the latter comprising an endless articulated chain including slotted links, and a pair of pins projected through the opposite end portions of each link and moveable in the slot lengthwise of the link, and flight attachments adapted to be connected respectively to said links, each of said flight attachments including an adapter disposed in overlying interlocked relation to the associated link, a second adapter disposed in underlying interlocked relation to the associated link, and a flight unit having a portion interposed between said second adapter and suspended means to protect said link chain against wear, and having other portions which depend from said interposed portion in overhanging relation to said suspended means and which are in the form of inverted T-shaped flight appendages each centrally disposed between the sidewalls of said conduit, said adapters and flight unit being secured against displacement by elements which removably project through the link slot, said adapters, when secured as aforesaid coacting to insure again movement of the associated pair of said pins as aforesaid in the slot lengthwise of the link.

2. In a continuous flow conveyor for conveying flowable solid material, an endless conduit through which said material may be moved along a substantially horizontal plane, and chain means traversable through said conduit to move said material, said conduit being provided internally with means suspended from the top of said conduit and having an upwardly presenting surface for slidably supporting said chain means, the latter comprising an endless articulated chain including slotted links, and a pair of pins projected through the opposite end portions of each link and moveable in the slot lengthwise of the link, and flight attachments adapted to be connected respectively to said links, each of said flight attachments including a flight unit having a portion underlying and extending lengthwise of the associated link and slidably supported directly upon the upwardly presenting surface of said suspended means, the effective depth of said flight unit portions being sufficient for elevating said chain links above the upwardly presenting surface of said suspended means out of frictional contact therewith to thereby protect the same against wear, means for securing said flight unit portion to the associated link including a pair of spacer elements abutting the opposed sides of the pair of pins at opposite ends of the link, said spacer elements being conjointly operative to maintain said pair of pins against shifting movement toward one another within the link slot lengthwise of the link, and at least one additional flight unit portion depending from said first mentioned flight unit portion in overhanging relation to said suspended chain support means, said additional flight unit portion being a flight appendage extending across said conduit between the sidewalls thereof.

3. In a continuous flow conveyor for conveying flowable solid material as defined in claim 2 wherein separable parts of the flight attachment one of which overlies and the other of which underlies the associated link respectively mount the pair of pin spacing elements.

References Cited in the file of this patent
UNITED STATES PATENTS

| | | |
|---|---|---|
| 367,102 | Hospes et al. | July 26, 1887 |
| 674,480 | Sheldrick | May 21, 1901 |
| 865,837 | Weston | Sept. 10, 1907 |
| 1,214,427 | Cokus | Jan. 30, 1917 |
| 1,685,112 | Wilmot | Sept. 25, 1928 |
| 2,164,124 | Slater | June 27, 1939 |
| 2,635,734 | Hampton | Apr. 21, 1953 |

FOREIGN PATENTS

| | | |
|---|---|---|
| 177,087 | Switzerland | Aug. 1, 1935 |